United States Patent [19]

Johnson et al.

[11] 4,057,372
[45] Nov. 8, 1977

[54] AERATOR

[75] Inventors: Lawrence E. Johnson, Dana Point; William W. Conger, IV, Santa Ana, both of Calif.

[73] Assignee: Lawrence E. Johnson, Dana Point, Calif.

[21] Appl. No.: 607,299

[22] Filed: Aug. 25, 1975

[51] Int. Cl.² ............................................ F04B 17/00
[52] U.S. Cl. .................................. 417/424; 210/169; 415/119; 417/244; 417/312
[58] Field of Search ............... 417/244, 366, 424, 198, 417/199 R, 312, 423 A; 415/119, 219 R; 210/169; 181/53 K, 53 P

[56] References Cited

U.S. PATENT DOCUMENTS

| 2,731,194 | 1/1956 | Kent | 415/119 |
| 2,843,314 | 7/1958 | Hansen | 415/119 |
| 2,875,947 | 3/1959 | Bradley | 417/366 |
| 3,082,940 | 3/1963 | Frantz | 417/366 |
| 3,199,774 | 8/1965 | Lowell | 417/366 |
| 3,240,000 | 3/1966 | Hayes et al. | 417/423 A |
| 3,264,999 | 8/1966 | Tutthill | 417/424 |
| 3,346,174 | 10/1967 | Livens et al. | 415/119 |

Primary Examiner—C. J. Husar
Attorney, Agent, or Firm—Gausewitz, Carr & Rothenberg

[57] ABSTRACT

An aerator for a spa is made of a section of pipe mounted to a base having an axially directed output fitting. A blower oriented axially of the pipe is mounted near the base in an annular mounting and sealing ring, and one or more additional blowers may be mounted to provide a series of blower stages all axially aligned with one another along the pipe. A solid body of porous foam having a through aperture fills the pipe above the first of the blowers and a cover is detachably connected to the top of the pipe section housing.

13 Claims, 5 Drawing Figures

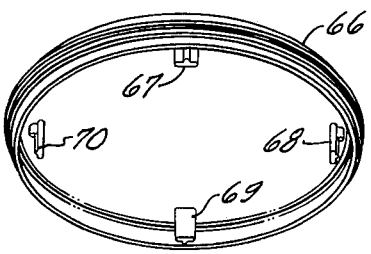
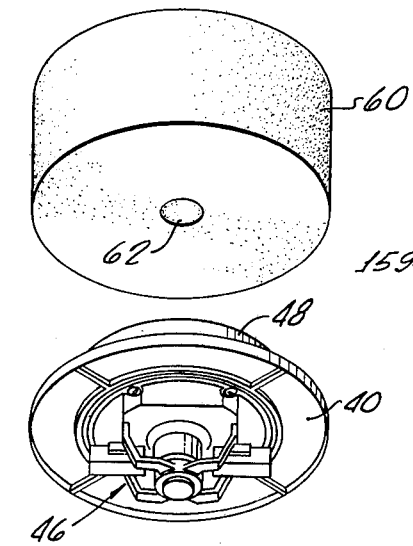
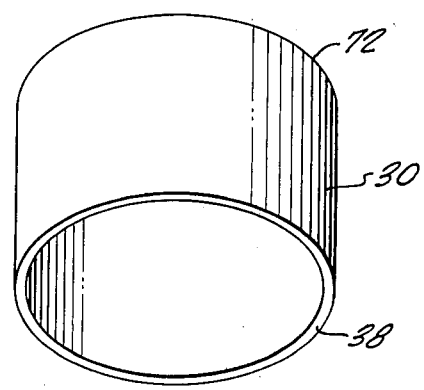
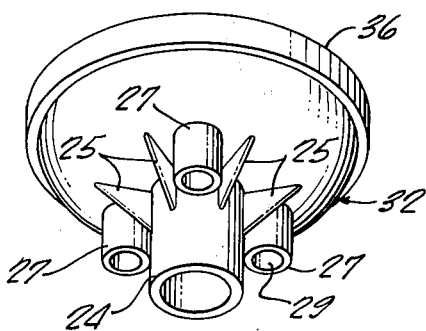
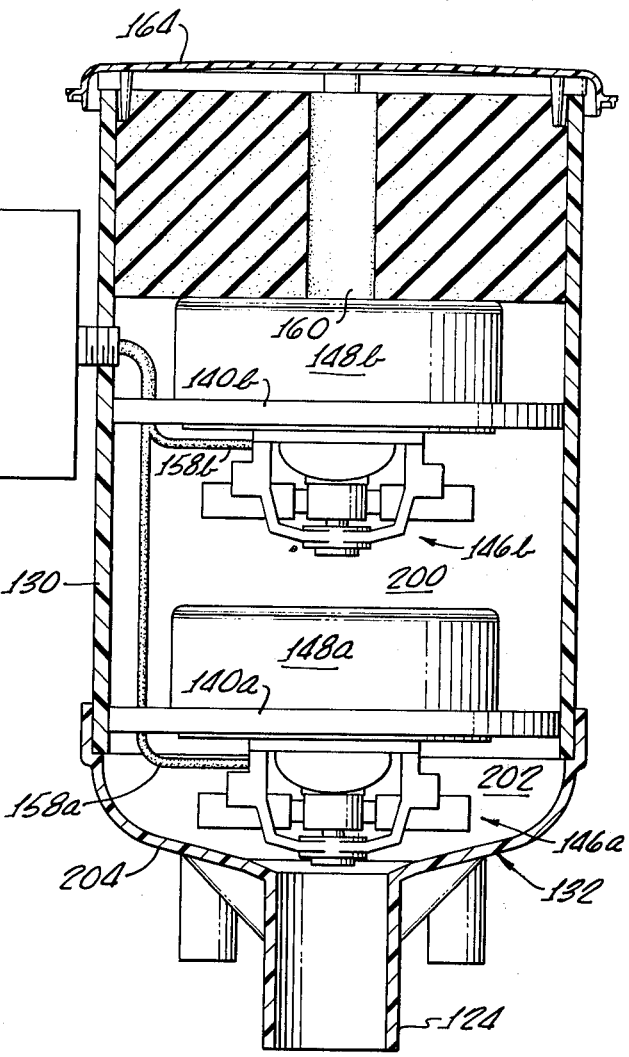

AERATOR

BACKGROUND OF THE INVENTION

The present invention relates to aerators and more particularly concerns an improved aerator for a spa.

In a common and widely used type of spa a recirculating water system is provided including a return line for flowing heated water to the basin in which the spa water is confined. The desired and beneficial action of the spa is provided or at least enhanced by flowing air into the returning water so that a number of jets of aerated or bubble-filled water are provided at various points about the spa basin. Commonly used blower systems are noisy and provide insufficient air flow and pressure unless large, high amerage motor blower units are employed. Even so, these are inefficient and difficult to install, often requiring a relatively large concrete supporting base.

When the aerator is not operated, water from the spa basin or return line of the recirculating system flows upward in the air output line of the blower. Thus the latter, when its starts, must push against a heavy load caused by the pressure of several feet of water which must be blown back through the blower output line. This heavy load has an adverse affect upon motor brush life and the brushes accordingly, must be frequently changed. Thus, noisy operation, relatively short lift, inefficiency and large installation areas are among problems encountered with present-day aerators. Even those aerators of the prior art in which thin sheets of fiberglass glass insulation have been employed to line the housing are still undesirably noisy and lacking in efficiency. Installation space requirements and brush life are still significant problems.

Accordingly, it is an object of the present invention to provide an improved aerator that eliminates or minimizes the abovementioned problems.

SUMMARY OF THE INVENTION

In carrying out principles of the present invention in accordance with a preferred embodiment thereof an aerator housing is formed of a cylindrical pipe section having a base secured and sealed to its bottom. An axially directed output fitting is formed in the base and one or more motor blower assemblies are axially mounted in the housing to cause air to flow directly into the axially directed output fitting. Each motor blower assembly comprises an annular mounting and sealing ring fixed and sealed to the housing and a motor blower unit sealed to and carried by the ring. A muffler is mounted within the pipe section at the input to the first motor blower unit. Preferably, the muffler fills the entire body of the housing between one end thereof and the motor blower unit and is provided with a relatively small through aperture. The entire aerator is arranged for a straight through axial flow of air, thus minimizing nose and turbulence and maximizing output pressure and efficiency.

BRIEF DESCRIPTION OF THE DRAWINGS

FIG. 2 is an exploded perspective view of a single stage aerator;

FIG. 5 is a vertical sectional view of a two-stage aerator embodying principles of the present invention.

DETAILED DESCRIPTION

Figure 1:
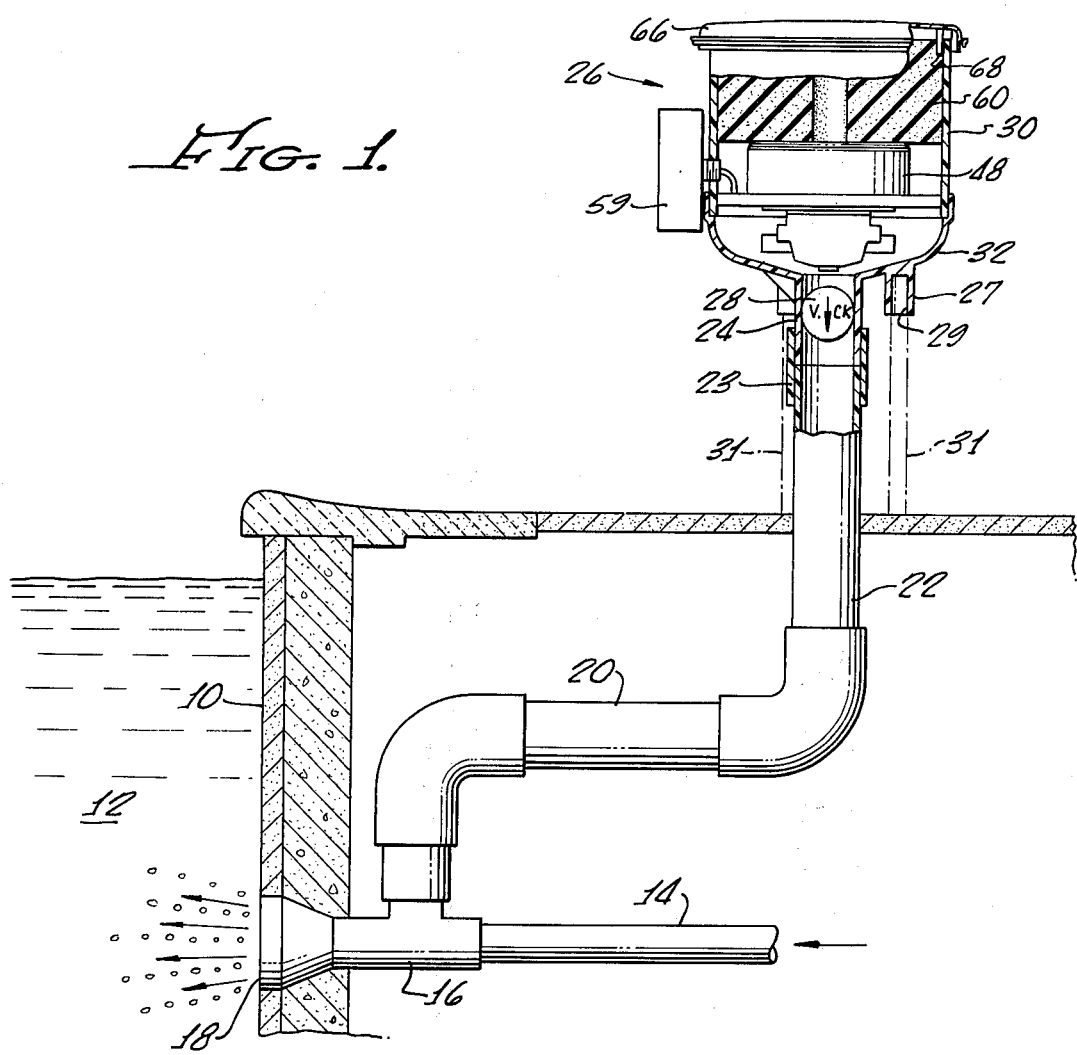
FIG. 1 is a sectional view of an aerator embodying principles of the present invention installed adjacent the wall of a spa.

As illustrated in FIG. 1 a conventional spa (only a portion of which is shown) includes a wall 10 confining a body of water 12. A recirculating system (not shown) is employed to flow water via a water return line 14 through an aerator fitting 16 to an outlet port 18 in the wall 10 below the surface of the water 12. Generally a number of such outlet ports are spaced about the spa basin. Aerator fitting 16 is connected via an air flow conduit 20, 22 to an output fitting 24 of an aerator assembly 26 constructed and arranged in accordance with the principles of the present invention. If deemed necessary or desirable, a check valve 28 is mounted in the output fitting 24 so as to completely close this output fitting should the water in return line 14 back up through the conduits 20, 22.

Figure 3:
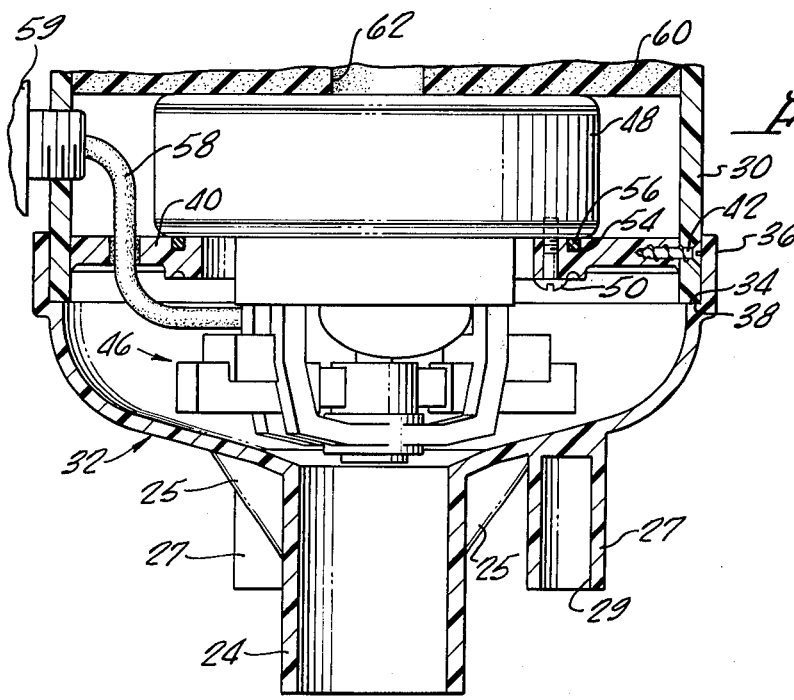
FIG. 3 is a sectional view of parts of the aerator.

As best shown in FIGS. 2 and 3, the aerator assembly includes a housing 30 conveniently formed of a section of standard plastic (such as polyvinyl chloride) pipe of approximately eight inches inside diameter. The use of standard pipe section as the housing enables different lengths of aerator, of one, two or more stages to be readily manufactured without excessive mold costs, merely by selecting an appropriate length of pipe section for the housing. Fixed to the bottom of the pipe housing in sealed relation thereto is a dish-shaped base 32 having an axially positioned and outwardly directed output fitting 24 integrally formed therewith. The upper side of base 32 is open, providing an axially and upwardly facing shoulder 34 surrounded by an upwardly projecting peripheral flange 36. The bottom edge 38 of the pipe section 30 seats upon the shoulder 34 and is received within the flange 36 to which it is sealed by a suitable adhesive or sealing compound (not shown).

Output fitting 24 provides an axially positioned and balanced single support for the entire aerator assembly. This fitting may be strengthened by a plurality of circumferentially spaced gusset plates 25 fixedly connected to and between the body of the base 32 and the outer surface of the fitting 24. Thus, the output fitting 24 may be conventionally connected to the upstanding air conduit 22 (FIG. 1) by means of a conventional sleeve 23 secured to both the fitting and conduit by suitable means such as a common plastic adhesive, where the parts are made of plastic pipe.

For those aerators that may require additional support, as in multi-stage aerator units to be described below, base 32 is additionally provided with a plurality (three is preferred) of integrally formed downwardly projecting fittings 27, each having a downwardly opening recess 29 for reception of a supporting leg such as leg 31 illustrated in FIG. 1.

An annular sealing and mounting ring 40 is fixedly secured to and sealed within the pipe section 30 adjacent the lower end thereof which is received within the upper edge of the dish-shaped base 32. Conveniently screws or pins 42 extend through the sides of the pipe section into the outer peripheral edges of the ring and a sealing compound is placed between the peripheral edge of the ring and the inner surface of the housing.

A conventional motor blower unit having a motor assembly 46 and a coaxial blower 48 including a blade assembly (not shown) fixed to the motor shaft, is mounted upon and sealed to the annular mounting ring 40. Blower 48 has a diameter greater than the inner diameter of the annular ring and may simply rest upon the upper surface of the ring with the motor 46 depending from the blower 48 and extending through the ring 40. Ring 40 is formed with a plurality of circumferentially spaced apertures receiving a number of bolts 50 extending through the apertures and threadedly received in the body of blower 48. The latter is sealed to the upper surface of ring 40 by suitable means which could take the form of a ring of sealing compound pressed into the joint between the blower and ring. Alternatively, as illustrated in FIG. 3, the sealing ring is formed with an upwardly facing circumferential groove 54 extending about the inner periphery of the ring. A sealing O-ring 56 is captured within the peripheral groove and pressed against the underside of the blower 48 to seal the latter to the support ring 40.

Power wires 58 extend from the motor 46 through a sealed aperture in the ring 40 and thence through the housing 30 to a connection and control box 59 mounted to the housing. Preferably, the wires 58 are sealed to the aperture and ring 40 by a hard adhesive such as an epoxy so that the procedure of connecting the wires to other circuitry at the outlet box 59 will not disturb the seal at the output of the blower 48.

A major portion of the length of the pipe section housing 30 extends above the blower 48 and substantially all of the area within the housing is filled with a muffler 60. Muffler 60 is preferably a porous plastic foam body having an outer diameter substantially equal to the inner diameter of the housing 30 to provide a snug fit of the muffler in the housing. An axial through aperture 62 extends through the center of the foam muffler body 60 to provide air flow to the input of the blower 48.

Figure 4:
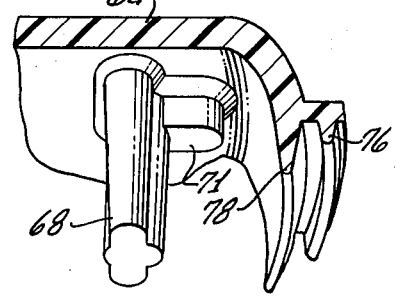
FIG. 4 is a fragmentary perspective view showing details of the cover configuration.

A cover 66 having a diameter greater than the outside diameter of the housing 30 has a plurality of circumferentially spaced support elements 67, 68, 69, 70 fixed thereto and positioned so that the outer surfaces thereof will snugly engage the inner surface of the pipe section housing 30. Each cover support has a downwardly facing shoulder 71 (FIG. 4) which seats upon the upper edge 72 of cover housing 30 thereby spacing the body of the cover above the upper edge of the housing to provide an annular air input.

The edge of cover 64 includes an outwardly projecting circumferential lip formed with means for decreasing flow of water into the housing as air is drawn into the housing past the lip. Flow of water is decreased by a lip configuration that provides a somewhat surpentine path for water flowing over the lip surface. Such a path is achieved by forming the lip with annular peripheral flanges 76, 78 projecting downwardly from the lip. Thus, flow of water to the interior of the housing is considerably impeded and decreased by the fact that water flowing over the cover is drawn by the inflowing air along the relatively extended and surpentine path over the surfaces of and between the several downwardly projecting flanges.

Where a greater flow and pressure of air are required, the aerator of FIGS. 1 through 4 may be simply modified to provide a number of stages of motor blower units all axially aligned as shown in FIG. 5.

In the two-stage arrangement of FIG. 5, a housing section 130 is substantially similar to but considerably longer than the corresponding section 30 of the previously described embodiment and is connected to a base 132 which may be identical to the previously described base 32. In this arrangement two motor blower stages are provided, each being substantially identical to the motor blower unit and its mounting described above in connection with FIG. 2. Thus, two mounting and support rings 140a and 140b are fixed and sealed to and within housing section 130 at axially spaced points along the inside of the housing. Each support ring 140a, 140b mounts a motor and blower 146a, 148a, 146b, 148b, each of which is mounted to and coacts with its mounting ring just as previously described in connection with the embodiment of FIG. 2. Electrical leads 158a and 158b are passed through and sealed within apertures in the two mounting rings for connection to a source of electrical power in an outlet box 159. Each assembly of mounting ring, motor and blower is identical with the corresponding assembly described in connection with the embodiment of FIG. 2. A muffler 160, identical to muffler 60 of FIG. 2, is mounted atop the first of the motor blower units completely filling the space within the housing above this unit, 146b, 148b. A cover 164 is mounted to the housing just as described in connection with the previous embodiment.

In this multi-stage arrangement, two pressurized chambers are provided by the mounting and supporting rings 140a, 140b together with the base 132. A first of these chambers, chamber 200, is formed between the mounting ring 140b together with its motor and blower units and the second mounting ring 140a together with its motor and blower unit.

A second output chamber 202 is formed between the second ring 140a and its motor and blower and the assembly base 132. Air drawn into the multi-stage unit between the upper edge of the housing and the cover 164 flows through the aperture in muffler 160 to the blower 148b where it is blown into and pressurizes the first chamber 200. This pressurized chamber 200 forms the input of the second motor blower stage which flows air under still higher pressure into the second chamber 202 from whence it is forced outwardly of the assembly via the axially directed output fitting 124.

Thus, it will be seen that this multi-stage unit, just as in the single stage unit as previously described, all of the air flows axially of the assembly, flowing through the muffler axially into the axially directed first stage, thence into the first pressurized chamber 200 and axially thereof through the second motor blower stage into the final pressurized chamber 204 and axially out of this chamber. The same type of straight through axial flow is provided in the single stage arrangement illustrated in FIG. 2.

This axial straight through flow provides a number of advantages, among which are the following. The axial position of the downwardly projecting output support fittings 24 and 124 conveniently provide a balanced support so that the entire assembly may be readily connected to and supported upon a single conduit, such as conduit 22, projecting from the ground without the necessity of providing elaborate relatively large area supports. A second advantage is that operation is considerably quieter since there is less turbulence than in the prior systems. The latter employ radially directed output fittings or various other flow redirecting connections where air is caused to flow through radially outwardly directed fillings. Partly because of the decreased turbulence there are less losses in the present system and thus a greater output flow. Because of the use of a downwardly directed aixal output fitting, fewer fittings are required and fewer elbows or flow directing fittings are needed. Still further, the axial arrangement provides a much improved compact packaging of the components of the system and enables a considerably smaller final output chamber, thus improving efficiency.

A surprising and unexpected result of employing the described multi-stage arrangement is the significantly increased brush life. In prior systems where increased output has been desired, larger motor blower units of larger horsepower have been employed. Thus, it has been common in the past to use a six ampere motor blower unit for installations requiring relatively small amounts of air and to use a 12 ampere motor blower unit where larger amounts of air are required. With the multiple stage arrangement of FIG. 5 on the other hand, each of the motor blower units is still of a smaller six ampere capacity. This provides a system comparable to the large prior art 12 ampere unit. Yet, the two-stage axially directed arrangement employing two six ampere motor blower units has been found to provide an unexpected increase in motor life, increasing motor life by a factor of two or more. An additional unexpected result is the increased pressure of the air output available from two stages of six ampere motor blower units arranged as illustrated in FIG. 5 as compared with a single 12 ampere motor blower unit. It is found that considerably increased pressure is available with the two-stage unit. This greater pressure gives a considerably greater aeration action since a significant aspect of the desirable aeration action depends upon air pressure even more so than upon the quantity of air flow. For example, it has been found that a recirculating water pump of from 1½ to 2 horsepower is required with prior art aerators to obtain desirable aeration action. Yet, a fully equivalent aeration action and airflow are availabe when employing a ½ horsepower water recirculating pump and a two-stage blower of the type illustrated in FIG. 5.

Yet another advantage of the construction and arrangement illustrated in FIGS. 2 and 5 is the ready availability of employing even more stages such as three, four or even five separate stages arranged as in the manner depicted in FIG. 5. Such an arrangement is available merely by extending the length of the housing and adding additional assemblies of support rings and motor blower units.

A unique and surprising aspect of the mufflers 60 and 160 is the fact that the same muffler is operable for providing a maximum decrease in the noise of operation in either a single or a multi-stage unit. In an exemplary embodiment employing an eight inch inside diameter housing and an eighth inch outside diameter foam body muffler having an internal aperture of 1½ inches, the preferable minimum length of the muffler is three inches. It is found that if the muffler length is less than 3 inches, noise is undesirably increased, whereas if the length is greater than 3 inches, noise level remains the same. In other words, a length of muffler greater than three inches surprisingly produces little additional noise suppression. Yet the muffler that almost completely fills the housing at the blower unit exhibits a surprisingly improved reduction of noise as compared to a system where the housing is limited with absorbing material.

An additional advantages of the multi-stage operation of axially directed motor blower units resides in the ready availability of convenient and inexpensive speed control. Thus, instead of employing a complex, inefficient and costly conventional motor speed control, one may simply wire each of the individual motors of the several motor blower units to multi-position switch which will allow one, two or three of the motor blower units of a three-stage system to be operated at a given time depending upon the position of the switch. Thus, with the switch in a low speed position, only one of the blower units of a three-stage blower unit, for example, is caused to operate. Placing the switch in a second position will cause two of the motor blower units to operate, and in a third position, all three are caused to operate. Of course, two speeds are readily available in a two-stage system.

The positioning of the mounting ring adjacent the bottom of the housing provides for a more compact arrangement by mounting the motor blower unit at the bottom of the assembly and providing more room for the muffler. Concomitantly, this provides a smaller output chamber which specifically cooperates with the axially mounted output fitting.

Preferably all of the parts except for parts of the motor, blower and the outlet box, are formed of molded plastic having a high strength and good resistance to corrosion and other environmental conditions.

It will be seen that the various features of the described aerator assembly provide a synergistic affect that affords a quieter more efficient operation, demanding less power and less space for installation. The straight through design enables a compact arrangement and use of the full bodied flow through muffler at the input. This straight through design also enables use of inexpensive, readily available material for the housing. The arrangement greatly facilitates axial mounting of multiple stages of motor blower units, minimizes the number of fittings, minimizes turbulence of the flow, and minimizes size of pressurized chambers. The axial output fitting enables the use of a small output pressure chamber, avoids flow redirecting turbulent paths and, in addition, facilitates mounting of the entire assembly on a centrally located single pedestal support. The multiple stage axially positioned units which themselves facilitate the overall straight flow through arrangement provide increased pressure, inherently quieter operation, simplified speed control, and greatly increased motor life.

The foregoing detailed description is to be clearly understood as given by way of illustration and example only, the spirit and scope of this invention being limited solely by the appended claims.

What is claimed is:

1. An aerator for forcing air into the water of a spa, said aerator comprising
    a housing formed of a cylindrical pipe section, a base secured and sealed to the bottom of said pipe section and having an axially directed output fitting connected therewith,
    an annular support and sealing ring fixed and sealed to and within said pipe section adjacent said base,
    a motor blower unit fixed and sealed to said support ring in axial alignment with said pipe section, said motor blower having an air input on one side of said ring and an air output on the other side of said ring,
    a cover connected with the top of said pipe section, and
    a muffler mounted in said pipe section and comprising a continuous body of foam substantially completely filling the space between said motor blower unit and an upper edge of said pipe section, said body of foam having an aperture extending axially therethrough of a diameter that is several times less than the diameter of the pipe section, said muffler having a substantially flat input end thereof extending parallel to and spaced from said cover to define an air inlet chamber including means for providing an air inlet, said inlet chamber being in contact with said input end of said muffler over the entire cross-sectional area of said pipe section.

2. An aerator for forcing air into the water of a spa, said aerator comprising
   a housing formed of a cylindrical section, a base secured and sealed to the bottom of said section and having an axially directed output fitting connected therewith,
   an aerator fitting having an outlet port adapted to be placed below the surface of the water of said spa and having an input water line connected thereto,
   an air flow conduit connected to and between said aerator fitting and said axially directed output fitting,
   an annular support and sealing ring fixed and sealed to and within said section adjacent said base,
   a motor blower unit fixed and sealed to said support ring in axial alignment with said section, said motor blower having an air input on one side of said ring and an air output on the other side of said ring,
   a cover connected with the top of said section and including means for providing an air inlet,
   a muffler mounted in said section between the input of said motor and said cover,
   a second mounting and sealing ring connected and sealed to and within said section at a point spaced from said first-mentioned annular ring,
   a second motor blower unit mounted upon and sealed to said second ring and extending axially of said section, said second motor blower unit having an output at a side of said second ring adjacent said first ring and having an input at a side of said second ring remote from said first ring, said motor blower units providing an axial straight through flow of air through said housing.

3. The aerator of claim 2 including switch means for electrically connecting said motor blower units to a source of electrical power for selective operation of one or both of said motor blower units to thereby provide a multiple speed aerator.

4. The aerator of claim 2 wherein both said motor blower units are axially aligned with one another and wherein said first and second annular rings cooperate with said pipe section to define a chamber, said chamber forming an output chamber for said second motor blower unit and an input chamber for said first-mentioned motor blower unit.

5. The aerator of claim 2 wherein said air flow conduit includes a vertically extending end portion connected to said output fitting and supporting said housing.

6. An aerator for foring air into the water of a spa, said aerator comprising
   a housing formed of a cylindrical pipe section, a base secured and sealed to the bottom of said pipe section and having an axially directed output fitting connected therewith,
   an annular support and sealing ring fixed and sealed to and within said pipe section adjacent said base,
   a motor blower unit fixed and sealed to said support ring in axial movement with said pipe section, said motor blower having an air input on one side of said ring and an air output on the other side of said ring,
   a cover connected with the top of said pipe section and including means for providing an air inlet, said cover including a plurality of depending support elements fixed to the cover and removeably connected with an upper portion of said pipe section, said cover further including a circumferential lip projecting outwardly of said housing, said lip including means for decreasing flow of water into said housing as air is drawn into the housing past said lip, and
   a muffler mounted in said pipe section between the input of said motor and said cover, said muffler comprising a continuous body of foam substantially completely filling the space between said motor blower unit and an upper edge of said pipe section, said body of foam having an aperture extending axially therethrough of a diameter that is several times less than the diameter of said pipe section.

7. The aerator of claim 6 wherein said means for decreasing flow of water into said housing comprises at least one annular peripheral flange projecting downwardly from said lip to provide a barrier for flow of water over the surface of said lip.

8. An axial flow aerator assembly for aerating a spa or pool comprising
   a circular cylindrical housing section open at both ends,
   a base secured and sealed to one end of said housing and having an integral axially positioned and directed air output fitting thereon,
   an aerator fitting having an outlet port adapted to be placed below the surface of the water of said spa and having an input water line connected thereto,
   an air flow conduit connected to and between said aerator fitting and said axially directed output fitting,
   means for providing a straight through axial flow of air through said housing section and out through said output fitting of said flow conduit and aerator fitting, said means comprising
   a first motor blower unit mounted to and with said cylindrical housing,
   a cover on the other end of said housing and including means for providing an air inlet,
   a muffler interposed between said motor blower unit and said other end of the housing, a second motor blower unit axially aligned with said first-mentioned motor blower unit and mounted to and within said housing with the output of said second unit adjacent the input of said first-mentioned unit to thereby provide a plurality of axially aligned stages of motor blower units within said housing.

9. The apparatus of claim 8 including selection switch means for selectively connecting one or both of said motor blower units to a source of electrical power.

10. The apparatus of claim 8 wherein each of said motor blower units comprises an annular mounting and sealing ring, said ring being fixed to and sealed within said housing, and a coaxial motor and fan assembly mounted upon and sealed to said annular ring, said motor and fan assembly extending through said ring and having an input on one side of said ring and an output side on the other side of said ring, whereby said input and output sides of said motor and fan assembly are sealed from each other by said mounting and sealing ring.

11. An axial flow aerator assembly for mixing air with water for a spa or pool, comprising
   a circular cylindrical housing section open at both ends,
   a base secured and sealed to one end of said housing and having an integral axially positioned and directed air output fitting thereon,
   an aerator fitting having an outlet port adapted to be placed below the surface of said water and having an input water line connected thereto,
   an air flow conduit connected to said aerator fitting and having a vertically extending end section connected to said air output fitting of said housing,
   motor blower unit means mounted to and within said cylindrical housing for blowing air out of said housing section through said output fitting and through said air flow conduit to said aerator fitting,
   a cover on the other end of said housing spaced therefrom to provide an air inlet, and
   a muffler interposed between said motor blower unit and said other end of the housing,
   said base including support means for said base, for said housing and for the contents thereof,
   said support means comprising said output fitting and said vertically extending end portion of said air flow conduit.

12. An axial flow aerator assembly comprising
   a circular cylindrical housing section open at both ends,
   a base secured and sealed to one end of said housing and having an integral axially positioned and directed air output fitting thereon,
   a motor blower unit mounted to and within said cylindrical housing,
   a cover on the other end of said housing spaced therefrom to provide an air inlet,
   a muffler interposed between said motor blower unit and said other end of the housing,
   said muffler comprising a body of porous foam having a diameter substantially equal to the internal diameter of said housing and having an axial flow through aperture with a diameter considerably smaller than the diameter of said housing, the internal diameter of said housing and the diameter of said muffler both being approximately 8 inches, the diameter of said axial aperture in said muffler being about 1½ inches and the length of said muffler being not less than about 3 inches.

13. An axial flow aerator assembly for forcing air into the water of a spa or pool comprising
   a cylndrical housing section open at both ends, a base secured and sealed to one end of said housing and having an integral axially positioned and directed air output fitting thereon,
   an aerator fitting having an output port adapted to be placed under said water and having an input water line connected thereto,
   an air flow conduit connected between said aerator fitting and said output fitting,
   motor blower means mounted to and within said housing for blowing air axially of said housing section to said air output fitting,
   a cover on the cover end of said housing spaced therefrom to provide an air inlet, said cover including a circumferential lip projecting outwardly of said housing and at least one annular peripheral flange projecting downwardly from said lip to provide a barrier to flow of water over the surface of said lip, and
   a muffler interposed between said motor blower unit and said other end of the housing.

* * * * *

UNITED STATES PATENT AND TRADEMARK OFFICE
CERTIFICATE OF CORRECTION

PATENT NO. : 4,057,372
DATED : November 8, 1977
INVENTOR(S) : Lawrence E. Johnson, et al It is certified that error appears in the above-identified patent and that said Letters Patent are hereby corrected as shown below:

Col. 1, line 23: change "its" to ---it---

Col. 1, line 28: change "lift" to ---life---.

Col. 1, line 59: change "nose" to ---noise---.

Col. 4, line 66: change "fillings" to ---fittings---.

Col. 5, line 1 : change "aixal" to ---axial---.

Col. 5, line 36: change "availabe" to ---available---.

Col. 5, line 63: change "limited" to ---lined---.

Col. 5, line 64: change "advantages" to ---advantage---.

Col. 7, line 59: change "foring" to ---forcing---.

Col. 7, line 68: change "movement" to ---alignment---.

Col. 10, line 29: change "the cover" to ---the other---.

Signed and Sealed this

Thirtieth Day of May 1978

[SEAL]

Attest:

RUTH C. MASON
Attesting Officer

LUTRELLE F. PARKER
Acting Commissioner of Patents and Trademarks